United States Patent [19]

Yutori et al.

[11] Patent Number: 5,303,498
[45] Date of Patent: Apr. 19, 1994

[54] FISHING LINE

[75] Inventors: Toshiaki Yutori, Takasago; Yutaka Kanetsuki; Masaaki Katsumata, both of Kobe; Atsushi Kikuchi, Higashikurume, all of Japan

[73] Assignees: Kabushiki Kaisha Kobe Sekio Sho, Kobe; Daiwa Seiko, Inc., Tokyo, both of Japan

[21] Appl. No.: 842,172
[22] PCT Filed: Aug. 6, 1990
[86] PCT No.: PCT/JP90/01004
§ 371 Date: Apr. 3, 1992
§ 102(e) Date: Apr. 3, 1992
[87] PCT Pub. No.: WO92/02132
PCT Pub. Date: Feb. 20, 1992
[51] Int. Cl.$^5$ .............................................. A01K 91/00
[52] U.S. Cl. ................................... 43/44.98; 57/223
[58] Field of Search ............... 43/44.98; 57/212, 223, 57/902

[56] References Cited

U.S. PATENT DOCUMENTS

| | | | |
|---|---|---|---|
| 3,070,871 | 1/1963 | Rychebosch | 57/902 |
| 3,451,305 | 6/1969 | Christensen et al. | 43/44.98 |
| 3,949,141 | 4/1976 | Marzocchi et al. | 57/902 |

FOREIGN PATENT DOCUMENTS

| | | | |
|---|---|---|---|
| 175396 | 10/1949 | Japan . | |
| 59-1628 | 1/1984 | Japan . | |
| 61-165172 | 7/1986 | Japan . | |
| 62-257331 | 11/1987 | Japan | 43/44.98 |
| 1-160443 | 6/1989 | Japan | 43/44.98 |
| 1-260081 | 10/1989 | Japan | 57/223 |
| 2-210078 | 8/1990 | Japan . | |
| 2-210079 | 8/1990 | Japan . | |

*Primary Examiner*—Paula A. Bradley
*Assistant Examiner*—Jeanne M. Elpel
*Attorney, Agent, or Firm*—Oblon, Spivak, McClelland, Maier & Neustadt

[57] ABSTRACT

A fishing line composed of a strand of a plurality of steel wires twisted together and coated with synthetic resin, wherein the steel wire is a low carbon duplex structure steel wire in the fibrous fine metallic structure having a tensile strength of 300 to 600 kgf/mm$^2$ and coated by plating with anticorrosive metal on the outer surface, the twist pitch of the strand being 13 to 20 times the diameter thereof and the thickness of coating layer of synthetic resin being 4 μm or more. This fishing line is high in tensile strength and knot strength, and is hardly kinked or curled when subjected to impact.

1 Claim, 2 Drawing Sheets

FISHING LINE

TECHNICAL FIELD

The present invention relates to fishing lines for use in fishing and, more particularly, to improvement in the structure of fishing lines by which their knot strength, curling characteristic, and kink characteristic can be improved while the fundamental characteristics as fishing lines are satisfied.

BACKGROUND OF THE INVENTION

As fishing lines for use in fishing, there have conventionally been adopted synthetic resin wires composed of polyamide, polyester, or polyvinylidene fluoride resin, or metal wires composed of piano steel wire, stainless steel wire, or tungsten steel wire. Fundamental characteristics required for such fishing lines include a lower cutwater resistance, a better bite sensitivity, less subaqueous deterioration in the sea and river, and even flexibility. Moreover, the fishing lines are required to have different characteristics depending on the type of fish to be caught as well as on the way of fishing, and according to these characteristic requirements the aforementioned materials are selected. For example, fishing for ayu with a live decoy goes in such a way that the catch is drawn out in a rapidly flowing river approximately the instant the strike occurs, in which case the fishing lines involved are required to have greater tensile strength against impact force in addition to the fundamental characteristics described above. Therefore, the fishing lines for use in fishing are preferably metal wires that have about 1.5 times larger tensile strength than synthetic resin wires as well as smaller wire diameters.

Also, of the above-described fishing lines there has been a desire that such a one be realized as can be improved in tensile strength while being made further thinner in wire diameter, and that still has sufficient flexibility. Examples of such type of fishing line include one disclosed in Japanese Patent Laid-Open Publication No. 62-320472 (JP1-160443). This prior-art fishing line is formed by joining a plurality of amorphous metal wires together into a stranded wire and further coating it with a synthetic resin. This type of fishing line, which employs an amorphous metal, allows its tensile strength to be improved while being made thinner in wire diameter than conventional metal wires such as piano steel wires. Moreover, since the fishing line is structured by stranding together a plurality of solid wires, sufficient flexibility can be ensured.

However, the prior-art amorphous metal wire according to the above-cited patent laid-open publication, although being superior in tensile strength to those conventional metal wires, yet has suffered from lower knot strength for joining two fishing lines together or tying the fishing line to the hook such that the wire is easy to break. To prevent this, there has been adopted a countermeasure that some adhesive is used to bond the wire.

Furthermore, there is another problem in the above conventional fishing lines that they are inferior in their curling characteristic and kink characteristic which matter when some impact force acts thereon.

The curling mentioned above refers to the fact that a fishing line, when pulled into a tensional state with a large load and thereafter abruptly freed therefrom, will be subject to shape change in curls in its longitudinal direction. A large amount of such curls will cause the fishing line to be extended in length and reduced in tensile strength. Therefore, it is of significance to minimize the amount of curls in terms of improving the service life of the fishing line.

The kink mentioned above, in turn, refers to the state in which the curled portions are bent at an acute angle, bringing about a possibility that the fishing line may break. Accordingly, occurrence of kinks can be a critical wound for the fishing line. In consequence, it is important to minimize the occurrence of both curls and kinks with a view to improving the service life of fishing lines.

One method of improving the curling and kink characteristics may be that the fishing line is formed into such a wire diameter as to withstand any impact force; however, in such a case, subaqueous resistance will increase as much as the fishing line gets thicker, so that it can no longer meet the fundamental characteristic for the fishing line.

Accordingly, the object of the present invention is to provide a fishing line which can be improved in their knot strength while satisfying the fundamental characteristics for the fishing line, and yet which is superior in curling characteristic and kink characteristic.

DISCLOSURE OF THE INVENTION

The inventors of the present invention have made every effort to achieve the foregoing objective, finding that the occurrence of curls or kinks is related to both the strand pitch of the steel wire and the thickness of the synthetic resin with which the stranded wire is coated. The prior-art fishing line disclosed in the aforementioned patent laid-open publication only involves forming thin-resin film coating simply to prevent the stranded wires from being loosened, or specifying the strand pitch only to improve the roundness and appearance. Accordingly, the prior-art fishing lines cannot afford improvement in the curling characteristic and the kink characteristic. The inventors of the present invention have accomplished the present invention by finding out that specifying both the thickness of the synthetic resin film and the pitch of the stranded wires allows the fishing line to be improved in its curling characteristic and kink characteristic.

Further upon the metal wire itself to be employed for fishing lines, the inventors of the present invention have investigated a metallurgical structure that allows its strength to be substantially improved even if its wire diameter is thinned, reaching findings that follow. That is, among others, superior in processability is a steel wire material having a composite metallurgical structure in which a low-temperature transformation generative phase which is an Fe-C-Si-Mn series ferrobased alloy and which is composed of elongated martensite, bainite, or a mixed structure thereof is dispersed uniformly into the ferrite phase. Use of a wire material having such a metallurgical structure ensures a simple, positive formation of an extremely thin wire having a wire diameter of 100 $\mu$m or lower by using the cold wire drawing technique. Moreover, processing such a steel wire material into a processing strain of 4 or more by using the cold drawing technique will allow the formation of a uniform fibrous fine metallurgical structure in which the composite material formed in combination of the ferrite phase and the low-temperature transformation generative phase extends in one direction. The resulting extremely thin wire having such a metallurgical structure, it was found, is greatly improved in tensile strength up to 300 to 600 kgf/mm$^2$, while its toughness is equal to or around those of the conventional piano wires or stainless wires.

From a viewpoint that the above-mentioned metallurgical structure primarily accounts for the improvement in tensile strength, the inventors of the present invention have made further studies on its reinforcement mechanism. As a result, it was found that metallurgical structures having such a ultra-high strength as mentioned above have fiber intervals of 50 to 1000 Å and that the above-mentioned fibrous composite structure is constituted of 5 to 100 Å ultra-fine cells.

Thus, a first aspect of the present invention relates to is a fishing line in which a stranded wire provided by stranding a plurality of steel wires is coated with a synthetic resin, characterized in that outer surfaces of the steel wires are coated with an anticorrosion metal by plating, the strand pitch is 13 to 20 times the diameter of the stranded wire, the thickness of the synthetic resin is 4 μm or more, and that the knot strength of the fishing line is 50% or more of the stranded wire strength.

A second aspect of the present invention relates to a fishing line wherein the steel wires are two-phase structured low-carbon steel wires having a fibrous fine metallurgical structure and having a tensile strength of 300 to 600 kgf/mm$^2$.

Now the reasons that claim components are limited as herein described are explained below.

First, the reason why the steel wires are coated with an anticorrosion metal by plating is to improve the bonding force with the outer resin and to prevent any subaqueous deterioration. Available as the plating metal are anticorrosion metals such as Ni, Cu, Zn, and Al, while means for coating these metals may be wet plating or dry plating or others, such as electroplating, and hot dipping.

Second, the reason why the outer surface of the stranded wire is coated with a synthetic resin is to improve the roundness as a whole and thereby reduce the cutwater resistance, to protect the steel wires from water, sea water, and the like, and to improve the knot strength. Available as this resin are thermoplastic resins and the like such as polyamide, polyester, and polyurethane, while means for coating these resins may be, for example, dip coating which involves immersion into a resin bath.

What is meant herein by the thickness of the resin is, as shown in FIG. 1, thickness t equivalent to a half of the value resulting from subtracting the outer diameter D of the circumscribed circle of a stranded wire 3 from the outer diameter of a fishing line 1, where a resin thickness t of less than 4 μm would result in insufficiency in the above-described effects. Although the upper limit, in turn, is not particularly defined, too thick a one would cause reduction in tensile strength as well as deterioration in cutwater resistance and other characteristics. In this respect, the thickness of the resin is preferably not less than 4 μm and in the range of 0.1 to 0.5 times the strand wire diameter.

Third, the reason why the strand pitch is defined to 13 to 20 times the strand-up diameter in the present invention is that this range of strand pitch has proved to substantially decrease the possibility of occurrence of curls. Another reason is that any strand pitch of less than 13 times the strand-up diameter would cause residual strain of steel wires to become too large while a 20 times or more strand pitch would result in restoration of the stranded wire due to elasticity, making it impossible in some cases to retain the configuration as a stranded wire. In addition, the number of steel wires constituting the stranded wire is not particularly defined, but the sevenwire stranding is stable in structure and satisfactory in roundness, and even good in appearance.

Finally, the reason why the two-phase structured low-carbon steel wires having a fibrous fine metallurgical structure are adopted as steel wires in the second aspect of the invention is to ensure sufficient tensile strength required for a fishing line with the wire diameter even thinned. This steel wire can be manufactured in the following manner.

A wire material which is composed of 0.01 to 0.5% by weight of C, 3.0% or lower by weight of Si, 5.0% or lower by weight of Mn, and the rest of Fe and other inevitable unpurities and which is 3.5 mm or less in wire diameter is first heated to a temperature range from 700° to 1100° C. and then cooled (these heating and cooling may repeatedly be effected over a plurality of times), so as to prepare a wire material having a composite metallurgical structure in which a low-temperature transformation generative phase composed of martensite, bainite, or a mixed structure thereof, which may partly contain residual austenite, is dispersed evenly into the ferrite phase at a volume ratio of 15 to 75%. In addition, there is a description of such a preparation method in Japanese Patent Laid-Open Publication No. SHO 62-20824.

Next, the composite structure wire material obtained in this way is processed to a processing strain of 4 or more, preferably to 5 or more by the cold wire drawing technique, to combine together the ferrite phase and the low-temperature transformation generative phase, thereby forming a fibrous fine structure that extends in one direction as a metallurgical structure. Improving the degree of processing in this way allows the fibrous structure to be further microstructured and the fiber intervals to be narrowed, thus leading to the above-described fibrous fine metallurgical structure having a size of cells of 5 to 100 Å yielded through processing and fiber intervals of 50 to 1000 Å. In this case, a thin wire obtained through a drawing process with a processing strain of less than 4 would be on the way of development of the fibrous structure, imperfect in its structure, and therefore low also in its strength.

Described next is the reasons that various conditions have been set for the above-described manufacturing method.

C: To obtain the fibrous fine metallurgical structure according to the present invention and the tensile strength mentioned above, it is necessary to restrict the amount of C to be added. As a result of experiments, it proved that a range of 0.01 to 0.05% is appropriate.

Si: Although Si is effective as a reinforcement element for the ferrite phase, an excessive addition of it beyond 3.0% would cause the transformation temperature to be markedly shifted toward higher degrees and also cause the surface of the wire material to be more likely subjected to decarburization. Thus, the amount of adding Si is set to an upper limit of 3.0%.

Mn: It is true that Mn has effects of reinforcing the extremely thin wire and enhancing the hardenability of the two phases, but an excessive addition of it beyond 5.0% would only result in saturation of these effects. Thus, the upper limit of the addition is set to 5.0%.

Further, below explained are elements that are preferably restricted in their contents, elements that may be added, inevitable impurities, and the like.

H is a detrimental element that embrittles the steel; the higher the strength, the greater the effect of it. Accordingly it is preferable in the present invention to restrict it to 1 PPM or lower, and particularly preferable to 0.5 PPM. Effective methods of decreasing the amount of H in this case include degassing treatment with smelted steel, hot rolling followed by cooling control after heat-treatment with the wire material, and low-temperature dehydrogenation control.

In the present invention, it is allowable to add at least one element selected among Nb, V, and Ti so that the metallurgical structure of the extremely thin wire is microstructured. These elements should be added at a ratio of 0.005% or more in each case; however, an excessive addition of it would result only in saturation of its effect and besides disadvantageous from an economic point of view. Thus the upper limit of the addition is set to 0.5%.

The above-mentioned inevitable impurities include S, P, N, and Al.

S is preferably 0.005% or more to reduce the amount of MnS, which allows the ductility to be further improved. Meanwhile, it is also desirable to control the configuration of MnS inclusion by adding rare earth elements such as Ca or Ce.

P is an element remarkable in intergranular segregation; thus its content is preferably 0.01% or lower.

N is an element that is most likely to age if it exits in its solid solution state; therefore, it may age during processing to hinder the development of the processability, or age after processing to deteriorate the ductility of the extremely thin wire obtained through the drawing process. Thus, it is preferably 0.003% or lower.

Al tends to form oxide-related inclusions, which are difficult to transform such as to hinder the processability of the wire material; thus, normally it is preferably 0.01% or lower. Besides, according as the Si/Al ratio in the extremely thin wire becomes larger, silicate inclusions increase; especially when the amount of Al is small, the silicate-related inclusions will rapidly increase, causing some deterioration in the drawability as well as that in the characteristics of the extremely thin wire obtained through drawing process. Consequently the Si/Al ratio should be below 1000, and preferably below 250 for the present invention.

On the composite structure of the above-described wire material, the condition as set above that the volume ratio of the low-temperature transformation generative phase occupied in the ferrite phase be in the range of 15 to 75% is attributed to the following reason. With a ratio of less than 15%, although it is possible to obtain an extremely thin wire having a wire diameter of 100 μm or less by the cold drawing of the wire material having such a composite structure, the extremely thin wire obtained would result in some other than the fibrous fine metallurgical structure as described above, the fibrous structure being imperfect, and even in a tensile strength of 300 kg f/mm$^2$ or lower. With a volume ratio of the low-temperature transformation generative phase occupied in the ferrite phase being greater than 75%, on the other hand, the wire material would be easy to break during the drawing process; otherwise, even if it could be drawn without being broken, the extremely thin wire obtained would result in some other than the fine fibrous structure, as in the case of the ratio of less than 15%, the fibrous structure being imperfect, and even in a tensile strength as low as 300 kgf/mm$^2$ or lower.

As for the volume ratio in the wire material, the wire diameter and volume ratio of the wire material are restricted depending on the form of the low-temperature transformation generative phase, that is, on whether the generative phase is primarily elongated (or acicular) or globular in shape. It is to be noted here that "elongated" used above means that particles have a directional property while "globular" means not.

In consequence, when 80% or more of the low-temperature transformation generative phase is elongated, it is necessary that the volume ratio of the low-temperature transformation generative phase should be below 50% and the wire diameter be below 3.5 mm, while when 80% of the phase is globular, the volume ratio should be below 50% and the wire diameter below 2.0 mm. Furthermore, when the low-temperature transformation generative phase is a mixed structure between elongated and globular structures, the volume ratio should be below 75% and the wire diameter below 3.5 mm. In addition, although the lower limit of the wire diameter that the wire material should have is not particularly defined, it is normally 0.3 mm by today's technical standard.

BEST MODE FOR CARRYING OUT THE INVENTION

Now an embodiment of the present invention will be fully described in conjunction with an embodiment thereof.

Figure 1:
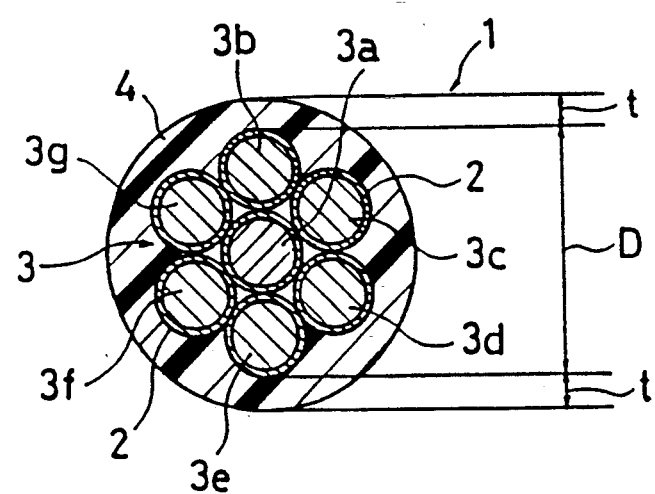
FIG. 1 is a sectional view for explaining the fishing line according to an embodiment of the present invention.
Figure 2:
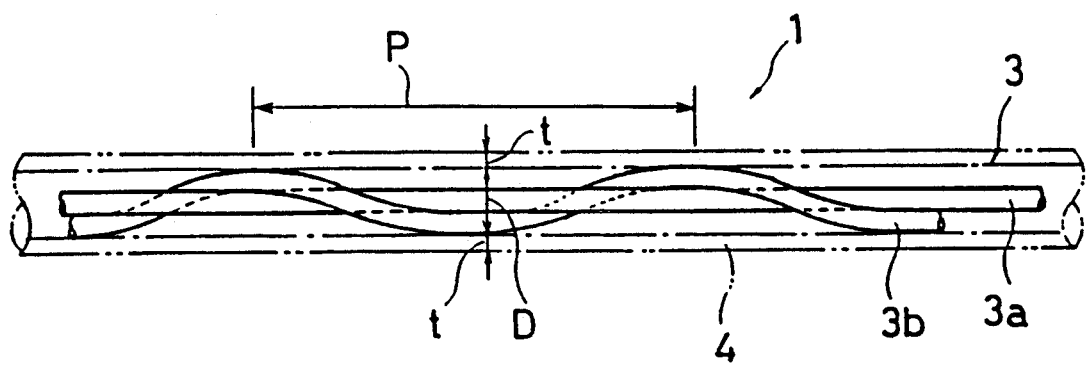
FIG. 2 is a schematic view showing a stranded state thereof.

FIG. 1 and FIG. 2 are views for explaining the fishing line according to an embodiment of the invention Referring to the figures, designated by reference numeral 1 is the fishing line of the present embodiment, which is formed by tying up seven steel wires 3a through 3g, whose surfaces are coated with Ni plating 2, and stranding the circumferential steel wires 3b through 3g in a spiral manner into a stranded wire 3 with the steel wire 3a held in a linear state, and moreover coating the stranded wire 3 with a synthetic resin 4. In this connection, piano wires or stainless wires are used as the steel wires 3a through 3g.

The strand pitch P of the stranded wire 3 is 13 to 20 times the diameter D of the circumscribed circle of the stranded wire 3, and the thickness t of the synthetic resin 4 is 4 μm or more.

According to the fishing line 1 of the present embodiment, as shown above, since the stranded wire 3 is coated with the synthetic resin 4 with a thickness of 4 μm or more and the strand pitch P is set to be 13 to 20 times the diameter D of the stranded wire, the curling and kink characteristics can be improved to a substantial extent, the service life of the stranded wire being prolonged.

Also, since the steel wires 3a through 3g are coated with the Ni plating 2 and the resin thickness t is made to be 4 μm or more, the bonding characteristic between the steel wires and the resin can be improved and the knot strength also increased as much as more than 50% of the stranded wire strength. Thus, it is possible to solve the problem that the wires are easy to break in tying up them as in the conventional case where a resin coating of 1 μm or so is formed onto the stranded wire composed of amorphous metal wires.

Moreover, since the Ni plating is provided to the surfaces of the steel wires $3a$ through $3g$, it is possible to prevent any subaqueous deterioration of the wire and besides improve the bonding characteristic with the synthetic resin 4, which contributes to preventing the resin at knot portions from being peeled off. Accordingly, the resulting fishing line can prevent any sound from being generated in water and the knot portions from loosening.

Here described are the experiments for establishing the effects of the fishing line 1 of the present embodiment.

First referring to the fishing line adopted for this experiment, piano wires and stainless wires (SUS304) were employed as steel wires, where seven wires were stranded together for each set of stranded wires in such a way that the strand pitch would be 12 to 23 times the diameter D of the stranded wire. Then the resulting stranded wires were coated with a synthetic resin having thicknesses of 2 to 10 μm, thus preparing samples of fishing lines having diameters of 82 to 95 μm. In addition, there was also adopted a steel wire which was not coated with Ni plating, for comparison. With these samples, the steel wire strength and knot strength of the fishing lines were measured by tension test, and subsequently checked for their curling and kink characteristics. These characteristics were evaluated by the numbers of curls and kinks that have occurred per 250 mm of line when a 0.6 kgf impact load was applied to each fishing line. To do this, the impact load was exerted by abruptly cutting the fishing line with a 0.6 kgf dead weight suspended. Also, how the resin at knot portions of each fishing line was peeled off was examined as well.

The results are shown in Table 1, where Nos. 1 through 6 are assigned to piano wires while No. 7 is to stainless wires. As apparent from this table, there are almost no differences in the steel wire strength nor in the knot strength, as derived from the static load tests, among samples of Nos. 1 through 7. However, the impact load tests showed occurrence of curls and kinks, more specifically 3 to 8 curls and 1 to 5 kinks; when the resin thickness was 2 μm or less (No. 1), the strand pitch was 12 times (No. 3) and 23 times (No. 4), such that the fishing line may break. Furthermore, when no Ni plating was applied (No. 5), there occurred 3 kinks and 5 curls as it was deterioration in characteristics. This is considered to be due to insufficiency in bonding characteristic of the resin, in view of the fact that no surface finish had been made, although both the resin thickness and the strand pitch were within the specified range. What is more, in this case, the resin at knot portions were peeled off, which may cause the loosening of knots, occurrence of sound in water, subaqueous deterioration, and the like.

In contrast to this, the samples according to the present embodiment (No. 2, No. 6, and No. 7) resulted in only 2 to 4 curls and moreover no kinks that occurred while they satisfied the requirements of both steel wire strength and knot strength. Since fishing lines are subject to successive impact loads in actual use, less occurrence of curls due to the impact load is essential to prolong the service life of fishing lines. This being the case, the fishing lines according to the present embodiment are subject to less occurrence of curls, as shown above, and therefore capable of improving their service life to a great leap.

Next described is a fishing line according to a further embodiment of the present invention.

The fishing line of the present embodiment is just the same in its structure as that in FIG. 1 and FIG. 2, differing therefrom in that two-phase structured low-carbon steel wires are employed as its steel wires $3a$ through $3g$.

The steel wires $3a$ through $3g$ are produced by processing a 3.0 to 6.0 mm-in-diameter wire material, which is composed of 0.01 to 0.50% by weight of C, 3.0% or less by weight of Si, 5.0% or less by weight of Mn, and the rest of Fe and inevitable impurities, into a wire diameter range of 15 to 100 μm through primary heat-treatment, primary cold drawing, secondary heat-treatment, and secondary cold drawing. These steel wires $3a$ through $3g$ are two-phase structured low-carbon steel wires in which processed cells resulting from the processing are arranged in one direction in a fibrous manner to form a fibrous fine metallurgical structure, where the processed cells are 5 to 100 Å, the fiber intervals are 50 to 100 Å, and the tensile strength is 300 to 600 kgf/mm$^2$.

According to the fishing line 1 of the present embodiment, as shown above, the tensile strength of the steel wires $3a$ through $3g$ are substantially improved in their tensile strength as much as 300 to 600 kgf/mm$^2$ as compared conventional metal wires and amorphous wires.

Here described below are results of the experiments made to establish the effects of the fishing line 1 of the present embodiment.

EXPERIMENT 1

To do this experiment, as shown in Table 2, seven two-phase structured low-carbon steel wires having wire diameters of 19 to 23 μm were tied up together and stranded so as to prepare 5 stranded wires so that the strand pitch P would be 12 to 16 times the wire diameter, and the resulting stranded wires were coated with a synthetic resin having thicknesses of 3 to 10 μm, thereby fabricating fishing lines having an outer diameter of 75 μm (Class 0.2) (for experiment samples Nos. 1 to 5). Then the stranded wire strength and knot strength were measured with these fishing lines. Also, the number of curls and kinks that have occurred per 250 mm of line by applying impact loads of 0.5 to 1.0 kgf. To do this, the impact loads were exerted by abruptly cutting the fishing line with a dead weight of 0.5 to 1.0 kgf suspended.

Moreover, the same measurement was made for comparison, employing piano steel wires having a wire diameter of 82 μm (Class 0.25) with a resin thickness of 8 μm and a strand pitch of 23 times and a nylon wire having a wire diameter of 104 μm (Class 0.4) as well. In this case, it would be reasonable to employ a nylon wire having approximately the same wire diameter (78 μm) as in the samples of the above-described embodiment; however, such a nylon wire, when used, was broken only by applying the minimum impact load (0.5 kgf), which is the reason for adopting the above one having the larger diameter (104 μm).

As apparent from Table 2, it can be understood that samples No. 1 through No. 5 of the present embodiment showed higher values of both stranded wire strength and knot strength than those of a little larger-in-diameter piano steel wires (82 μm) and that they were, although a little lower in knot strength, higher in stranded wire strength for their smaller diameter as compared with the nylon wire far larger in diameter (104 μm).

Referring to the number of curls and kinks that have occurred, the samples of No. 1 and No. 2 of the present embodiment are approximately equal to that of piano steel wires and those of the nylon wire in terms of normal impact loads of 0.5 to 0.7 kgf; however, samples having preferable structures (experiment samples No. 4 and No. 5) showed substantially reduced numbers of curls and kinks that have occurred, which means great improvement in their service life. In addition, when an impact load was applied, the samples of nylon wires had fine irregularities generated on the surface of fishing lines, with a result of reduced strength, while the samples of the present embodiment did not involve any reduction in strength.

EXPERIMENT 2

Figure 3:
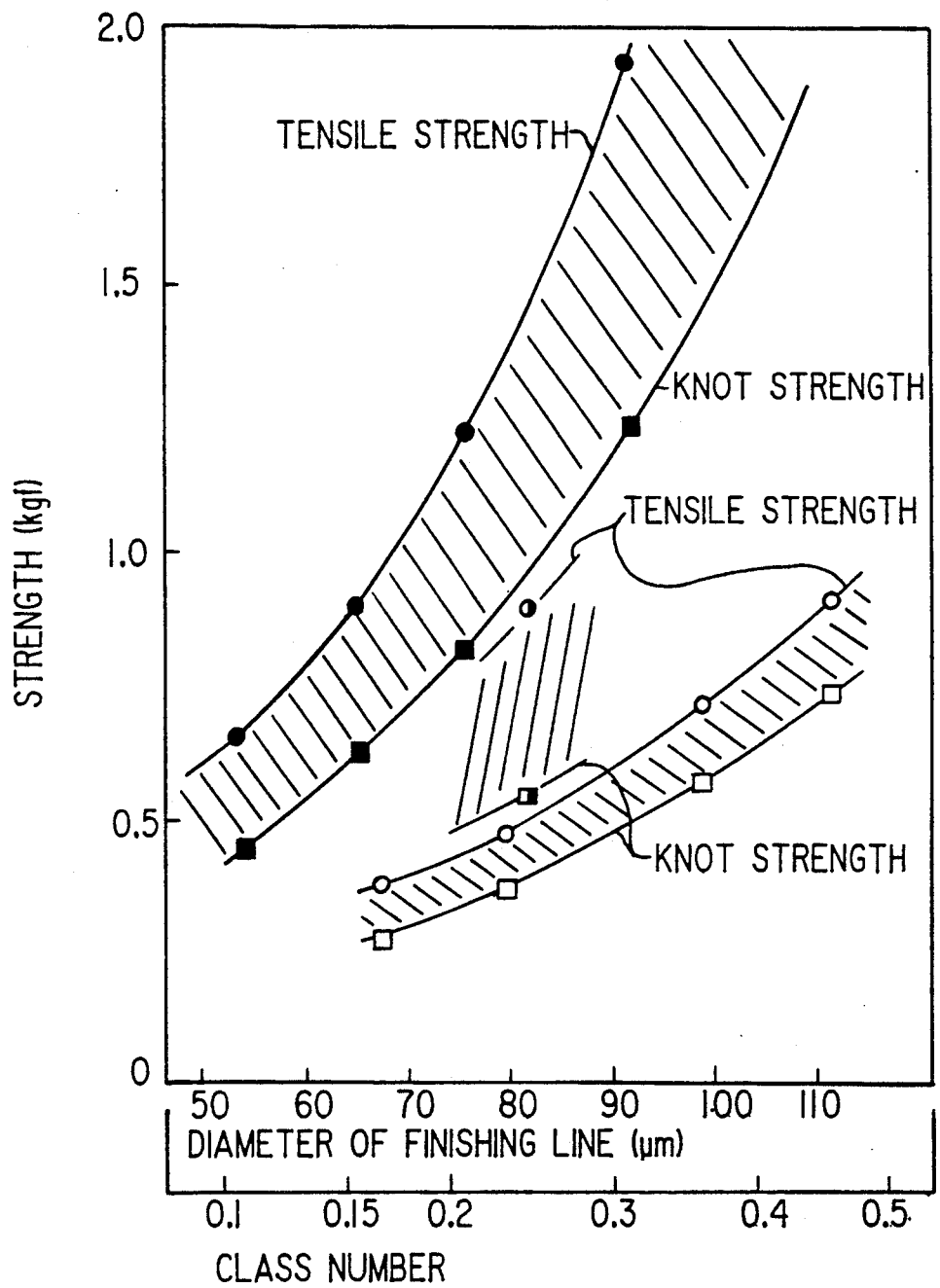
FIG. 3 is a characteristic view showing the results of experiments.

In this experiment, as shown in FIG. 3, tensile strength and knot strength were measured for various diameters of the fishing line of the present embodiment. Nylon wires were also employed here for comparison. In FIG. 3, the marks ●, ■ represent tensile strength and knot strength of the fishing line of the present embodiment, respectively, while the marks ○ and □ represent those of nylon wires. The marks ◐ and ◨ are for those of piano steel wires.

As apparent from FIG. 3, the fishing line of the present embodiment proved to be substantially improved in tensile strength as much as 2.1 to 3.2 times that of the nylon wires and in knot strength as much as 1.7 to 2.6 times of the same. The larger the diameter of the fishing line becomes, the greater the difference between them results.

EXPERIMENT 3

In this experiment, as shown in Table 3, after the fishing line of the present embodiment was immersed in water for 5 hours, its strength, knot strength, and winding strength were measured. As in the preceding experiments, nylon wires were employed also in this experiment for comparison. The winding strength mentioned above refers to the tensile rupture strength resulting when the fishing line is wound around a core wire with a diameter of 0.3 mm. Nylon wires having diameters of 78 μm and 97 μm were employed for comparison.

As apparent from Table 3, nylon wires, when immersed in water for 5 hours or more, resulted in reduced strength and knot strength as compared with before immersion in water, and in breakage due to subaqueous deterioration in terms of the winding strength. By contrast, in the fishing line of the present embodiment, even after immersing into water for 5 hours, it showed 100% strength and knot strength, and yet a slightly lowered winding strength.

INDUSTRIAL APPLICABILITY

According to the fishing line of the present invention, since the thickness of the synthetic resin is not less than 4 μm and the strand pitch is 13 to 20 times the wire diameter, the numbers of curls and kinks that will result when an impact load is applied to the fishing line can be reduced and yet the stranded wire strength will not be lowered even if there occurs any curling, thus contributing to offering a prolonged service life of the fishing line.

Also, since the steel wires of the fishing line are provided with metal plating and their circumferential faces are coated with a resin, the resulting stranded wire has the resin strongly bonded thereto, improving the knot strength to 50% or more of the stranded wire strength. This makes it possible to solve the problem of the conventional amorphous metal wires that they are easy to break when tied up together, of course eliminating the need for using any adhesive.

Furthermore, according to the fishing line of the present invention, the two-phase structured low-carbon steel wire employed as steel wires is so structured that 5 to 100 Å processed cells resulting from processing of cold drawing are arranged in one direction in fibrous manner to form a fibrous fine metallurgical structure with fiber intervals of 50 to 1000 Å, such that it has an ultra-high strength of 300 to 600 kgf/mm$^2$, as described with the reinforcement mechanism mentioned before. Accordingly, it is possible to improve its tensile strength to a great extent as compared with conventional piano steel wires and amorphous metal wires, and to reduce its wire diameter while a sufficient strength as a fishing line is ensured.

Yet further, since the two-phase structured low-carbon steel wire allows an easy realization of an extremely thin fishing line, the cutwater resistance involved can be reduced, while its high strength allows the elongation ratio to be reduced and the bite sensitivity to be improved accordingly. Also, the anticorrosion metal plating serves for preventing any subaqueous deterioration while the stranded structure in which a plurality of steel wires are stranded allows the flexibility of the fishing line to be improved. Thus, the resulting fishing line can meet the fundamental characteristics as a fishing line.

TABLE 1

| Sample | Steel wire material | Surface treatment | Diameter of fishing line (mm) | Resin thickness (mm) | Strand pitch | Strength (kgf) | Knot strength (kgf) | Strength ratio (%) | Peeling of knot portion | Number of kinks that occurred per 250 mm of line | Number of curls that occurred per 250 mm of line | Remarks |
|---|---|---|---|---|---|---|---|---|---|---|---|---|
| No. 1 | Piano wire | Ni plating | 0.082 | 0.002 | 16 | 0.95 | 0.55 | 58 | No | 1 | 5 | Comparative example |
| No. 2 | Piano wire | Ni plating | 0.082 | 0.008 | 16 | 0.92 | 0.56 | 61 | No | 0 | 3 | Invention |
| No. 3 | Piano wire | Ni plating | 0.082 | 0.008 | 12 | 0.88 | 0.48 | 55 | No | 3 | 8 | Comparative example |
| No. 4 | Piano wire | Ni plating | 0.082 | 0.008 | 23 | 0.98 | 0.59 | 60 | No | 5 | 3 | Comparative example |
| No. 5 | Piano wire | No | 0.084 | 0.010 | 16 | 0.92 | 0.57 | 62 | Yes | 3 | 5 | Comparative example |

TABLE 1-continued

| Sample | Steel wire material | Surface treatment | Diameter of fishing line (mm) | Resin thickness (mm) | Strand pitch | Strength (kgf) | Knot strength (kgf) | Strength ratio (%) | Peeling of knot portion | Number of kinks that occurred per 250 mm of line | Number of curls that occurred per 250 mm of line | Remarks |
| --- | --- | --- | --- | --- | --- | --- | --- | --- | --- | --- | --- | --- |
| No. 6 | Piano wire | Ni plating | 0.095 | 0.008 | 16 | 1.13 | 0.62 | 55 | No | 0 | 2 | Invention |
| No. 7 | SUS 304 | Ni plating | 0.095 | 0.008 | 16 | 0.89 | 0.52 | 58 | No | 0 | 4 | Invention |

TABLE 2

| Sample | Diameter of fishing line (mm) | Resin thickness (μm) | Strand pitch (times) | Stranded wire strength (kg) | Knot strength (%) | Impact load (kgf) | Number of curls that occurred per 250 mm of line | Number of kinks that occurred per 250 mm of line |
| --- | --- | --- | --- | --- | --- | --- | --- | --- |
| Embodiment No. 1 | 0.075 (Class 0.2) | 10 | 12 | 0.97 | 59.8 (0.58 kg) | 0.500 | 6 | 0 |
|  |  |  |  |  |  | 0.750 | 7 | 4 |
|  |  |  |  |  |  | 0.925 | 14 | 17 |
| Embodiment No. 2 | 0.075 (Class 0.2) | 3 | 12 | 0.963 | 67.5 (0.65 kg) | 0.500 | 10 | 0 |
|  |  |  |  |  |  | 0.740 | 8 | 8 |
|  |  |  |  |  |  | 1.000 | 16 | 36 |
| Embodiment No. 3 | 0.075 (Class 0.2) | 4 | 15 | 1.21 | 61.1 (0.74 kg) | 0.500 | 0 | 0 |
|  |  |  |  |  |  | 0.750 | 6 | 1 |
|  |  |  |  |  |  | 1.000 | 8 | 9 |
| Embodiment No. 4 | 0.075 (Class 0.2) | 6 | 15 | 1.19 | 63.9 (0.76 kg) | 0.500 | 0 | 0 |
|  |  |  |  |  |  | 0.750 | 6 | 2 |
|  |  |  |  |  |  | 1.000 | 8 | 10 |
| Embodiment No. 5 | 0.075 (Class 0.2) | 10 | 16 | 1.20 | 63.3 (0.76 kg) | 0.500 | 0 | 0 |
|  |  |  |  |  |  | 0.750 | 4 | 0 |
|  |  |  |  |  |  | 1.000 | 9 | 6 |
| Piano wire + resin coating | 0.082 (Class 0.25) | 8 | 23 | 0.90 | 57.8 (0.52 kg) | 0.500 | 5 | 0 |
|  |  |  |  |  |  | 0.750 | 4 | 4 |
|  |  |  |  |  |  | 1.000 | 8 | 15 |
| Nylon | 0.104 (Class 0.4) | — | — | 0.96 | 80.2 (0.77 kg) | 0.500 | 4 | 0 |
|  |  |  |  |  |  | 0.750 | 9 | 2 |
|  |  |  |  |  |  | 0.955 | 6 | 8 |
| Nylon | 0.104 (Class 0.2) | — | — | 0.96 | 79.9 (0.375 kg) | 0.500 | Break | — |

TABLE 3

| Sample | Diameter of fishing line (mm) | Immersion time (hr) | Strength | Knot strength (kgf) | Winding strength (kgf) |
| --- | --- | --- | --- | --- | --- |
| Embodiment | 0.093 (Class 0.3) | 0 | 1.627 | 0.922 | 1.061 |
|  |  | 5 | 1.622 | 0.945 | 1.031 |
| Nylon | 0.078 (Class 0.2) | 0 | 0.469 | 0.375 | 0.399 |
|  |  | 5 | 0.449 | 0.356 | — |
| Nylon | 0.097 (Class 0.3) | 0 | 0.729 | 0.588 | 0.630 |
|  |  | 5 | 0.710 | 0.556 | — |
|  |  | 10 | 0.692 | 0.519 | — |

What is claimed is:

1. A fishing line comprising:
a stranded wire defined by a plurality of stranded steel wires, said stranded wire being coated with a synthetic resin;
wherein:
outer surfaces of said steel wires are coated with an anticorrosion metal by plating;
a strand pitch of the stranded wire is 13 to 20 times a diameter of the stranded wire;
a thickness of said synthetic resin is 4 μm or more; and
a knot strength of said fishing line is 50% or more of a strength of the stranded wire;
wherein said steel wires are two-phase structured low-carbon steel wires having a fibrous fine metallurgical structure and having a tensile strength of 300 to 600 kgf/mm$^2$.

* * * * *